Feb. 2, 1971 L. BABANY ET AL 3,560,870

FREQUENCY SYNTHESIZER

Filed Dec. 2, 1968 2 Sheets-Sheet 2

United States Patent Office 3,560,870

Patented Feb. 2, 1971

3,560,870
FREQUENCY SYNTHESIZER

Lucien Babany, Blanc-Memil, and Michel Marchal, Paris, France, assignors to C.I.T.-Compagnie Industrielle des Telecommunications, Paris, France, a corporation of France Filed Dec. 2, 1968, Ser. No. 787,290
Claims priority, application France, Nov. 30, 1967, 130,483
Int. Cl. H03b 3/04
U.S. Cl. 331—4 14 Claims

ABSTRACT OF THE DISCLOSURE

Device for frequency interpolation with fine quantization steps (for example 1 kc.) in the output spectrum of a first wide band wide-stepped synthesizer (for example 100 kc.), essentially comprising a second low-frequency synthesizer controlled by the lowest order decades of the control box serving to indicate the desired frequency, and an auxiliary high-frequency synthesizer supplying a frequency which is the sum of the frequencies supplied by the first and second synthesizers.

Figure 1:
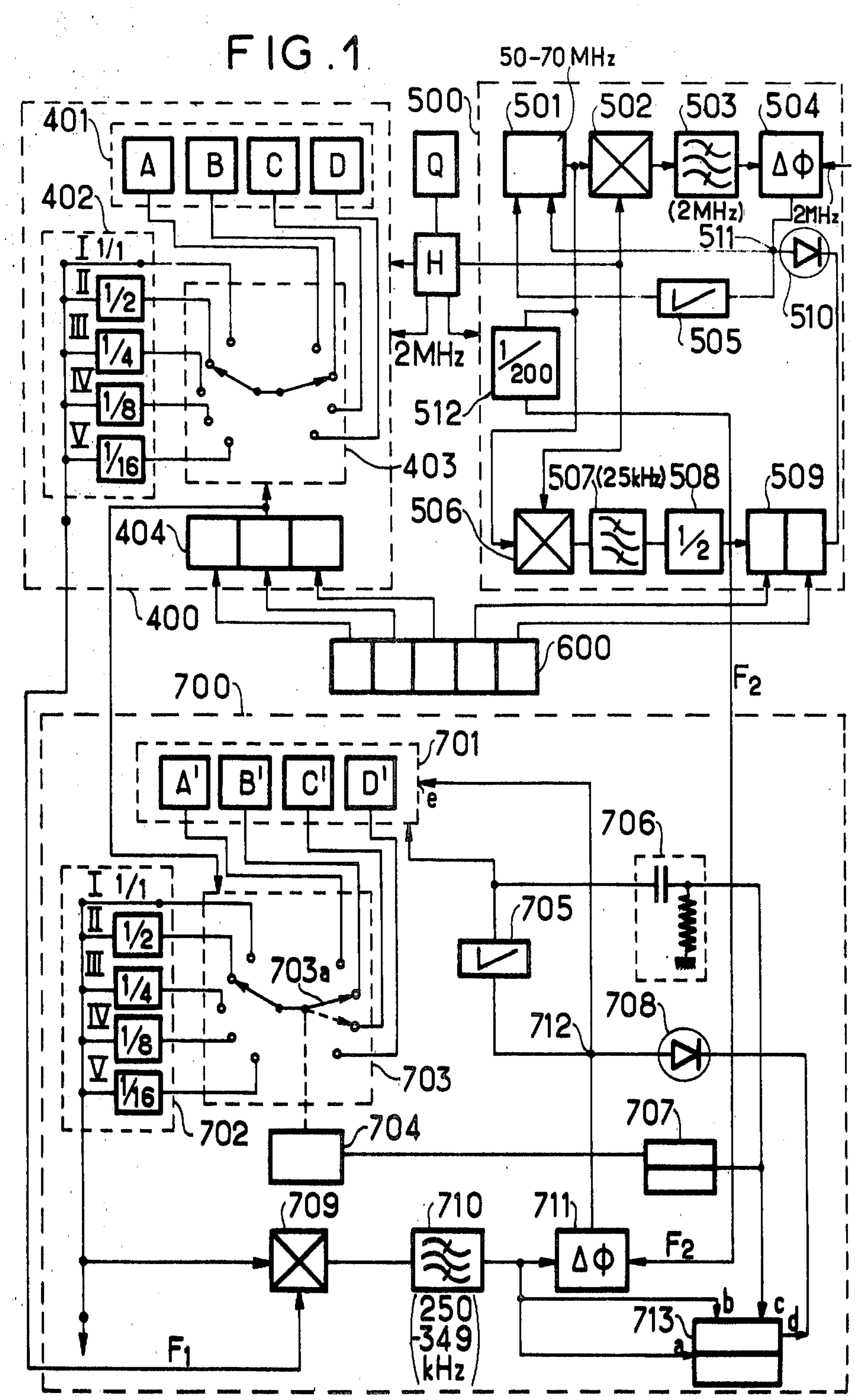

This invention relates to a frequency synthesizer assembly.

In co-pending application Ser. No. 697,522, filed Jan. 12, 1968, there is described an automatic frequency synthesizer having a frequency range of 2.5 megacycles to 80 megacycles with a quantification step of 100 kilocycles.

There is a technological reason for the choice of such a quantification step. A synthesizer which would give a much smaller quantification step, for example 1 kilocycle, and yet be able to cover the same range, could not with certainty have a speed of frequency exploration as rapid as that normally desired. In practice, a delay of only two or three seconds is acceptable between the time of posting of a desired frequency in a control box provided with the synthesizer and the delivery of the corresponding synchronized frequency. If the synthesizer is to function with a definition of 1 kilocycle throughout the frequency band, it would be necessary, to obtain the same reliability, to sacrifice speed of exploration. This would diminish the commercial attraction of equipment incorporating the synthesizer quite considerably, since it is normally required to have a dead time which is as short as possible.

It is an object of this invention to provide a synthesizer assembly having a relatively wide high frequency range and a relatively good definition while still having an acceptably small dead time between the time of posting of a desired frequency to be delivered and the appearance of that frequency at the synthesizer output.

In accordance with the broadest aspect of this invention a synthesizer assembly having a relatively wide high frequency range, comprises a first wide band high frequency synthesizer covering the range in relatively large quantification steps and providing a high frequency first signal, low frequency synthesizing circuitry having a relatively small quantification step and a relatively narrow frequency range which embraces the quantification step of the first synthesizer and from which is obtained a low frequency second signal, a control box adapted to have posted in it a numerical value significant of a desired frequency to be delivered by the synthesizer the control box having positions in which digits of the numerical value are placed, connections for applying respectively higher and lower order digits of the numerical value to the first synthesizer and said synthesizing circuitry to determine the first and second signal frequencies produced by them, a third synthesizer adapted to deliver a third frequency signal different from the first and second signal frequencies but synchronized in frequency by them while being equal to a modulation product of them, and a suppression circuit which prevents the third frequency signal of the third synthesizer being synchronized with any other frequency than said modulation product.

In accordance with a narrower aspect of this invention a frequency synthesizer assembly has a control box adapted to have posted on it a numerical value significant of the desired frequency to be delivered and composed of digits placed in respective positions in the control box, a first high frequency synthesizer having a relatively large range and a wide quantification step and controlled by higher order positions of the control box to provide a first frequency signal which is determined by the higher order positions, relatively low frequency synthesizing circuitry having a relatively small frequency range and narrow quantification step and providing a second signal at a frequency controlled by lower order positions of the control box, the first and second signals being capable of being modulated with one another to provide a modulation product equal to the desired frequency, a third frequency synthesizer providing a variable frequency third signal from an oscillator switchable between exploratory control at which it is adapted to hunt for the desired frequency and synchronized control at which the desired frequency is delivered after it has been found, a first modulator connected to receive the first and third signals and feeding a modulated output to a filter circuit having a pass band substantially equal to the frequency range of the second synthesizer; a frequency comparator connected to monitor simultaneously the modulated output transmitted through the filter circuit and the second signal frequency, the comparator providing a switching signal when there is coincidence between the two frequencies; a switching circuit adapted to respond to the reception of a switching signal from the comparator to switch the third synthesizer from exploratory control to synchronized control, and a suppression circuit effective during each frequency exploration of the third synthesizer oscillator to prevent the switching circuit from being switched into the synchronized state by the output of the comparator occurring with the first frequency coincidence detected by it during an exploratory sweep.

A synthesizer assembly constructed in accordance with the invention is able to provide a frequency synthesized at a relatively small quantification step of, for example, 1 kilocycle, throughout a relatively large frequency range which may span several dozens of megacycles. Moreover, the total duration of frequency exploration can be arranged to be of the same order as that normally associated with a frequency synthesizer having the same frequency range but a very much larger quantification step of, for example, 100 kilocycles.

In the preferred assembly for carrying out the invention a triple process of frequency exploration and synchronization is used. The first synthesizer suitably has a large quantification step of the order of 100 kilocycles and synthesizes a high frequency first signal suitably as described in the aforementioned co-pending patent application Ser. No. 697,522, and referred to hereafter as frequency $F_1$. Simultaneously, another synthesizer providing the frequency synthesizing circuitry is arranged to have a relatively small quantification step and to provide a relatively low output frequency range of, for example, 250 to 349 kilocycles. The second signal obtained from this synthesizer may be generated at a relatively small quantification step of 1 kilocycle such signal having a frequency $F_2$.

The third synthesizer to which the signal frequencies $F_1$ and $F_2$ are applied provides an interpolation loop which combines the frequency $F_1$ with a third signal obtained from the third synthesizer when in exploratory control, the combination of the two signals thus providing a modulation product of relatively low frequency and which can then be compared with the second signal $F_2$ to determine the precise instant when synchronization is to occur. It will thus be appreciated that the synchronization effectively occurs when the third frequency signal is equal to a modulation product of the first and second signals and as both of these are highly stable frequencies and are determined by the numerical value posted in the control box, the output frequency delivered after synchronization takes place is accurately determined.

The invention particularly lends itself to the synthesizer of the aforementioned co-pending patent application to improve its performance. The first synthesizer, designated below as $S_1$, may be constructed as described in the copending application so as to have a quantification step of 100 kilocycles and covering a range from 2.5 megacycles to 80 megacycles. The first signal delivered by the first synthesizer may be controlled by the first three positions of the control box which suitably has five positions corresponding to ascending decimal values.

The frequency synthesizing circuitry providing the low frequency second signal may be provided by a synthesizer of simple construction covering, for example the range 250 kilocycles to 349 kilocycles at a quantification step of 1 kilocycle. This synthesizer, designated below as $S_2$, has its output frequency controlled by the last two positions of the five position control box which therefore determine the frequency of the signal $F_2$.

The third frequency synthesizer, designated below as $S_3$ delivers the desired output frequency $F_s$ and has associated with it modulation, filtering, amplification and synchronizing circuitry. The output frequency $F_s$ delivered when in synchronized control is equal to the modulation product $F_1+F_2$.

For example, assuming that the frequency desired to be delivered and posted in the control box is 28,347 megacycles. The operator marks up in respective positions of the control box by turning respective knobs the numbers or digits 2, 8, 3, 4, 7. The first three figures (2, 8, 3) act on the first synthesizer $S_1$ which supplies (as a rough approximation used hereto simplify understanding of the invention) a first signal $F_1'$ equivalent to 283 frequency units, that is to say 28,300 megacycles. Meanwhile, the second low frequency synthesizer $S_2$ sets itself to give the second signal at a frequency of 250+47=297 kilocycles. The figure 250 corresponds to the lower end of the second synthesizer frequency range.

The interpolation loop provided by the third synthesizer $S_3$ provides, to a rough approximation, a frequency $F_s'$ which is applied to a modulator receiving at another terminal the frequency $F_1'$. The modulation product $F_s'-F_1'$ extracted from the modulator by an associated band-pass filter is applied to one terminal of a phase discriminator providing a frequency comparator and which receives at another terminal the second signal frequency $F_2'=297$ kilocycles. This of course is a stable frequency provided by the second synthesizer $S_2$. The frequency $F_s'$ delivered by the oscillator of the third synthesizer when switched to the synchronized condition by the output of the phase discriminator on detection of coincidence between the frequency $F_2'$ and the modulation product $(F_s'-F_1')$ is accordingly an accurately found frequency having a numerical value equal to 28,300+297=28,597 kilocycles.

It will be seen that the third signal $F_s'$ providing the output from the synthesizer assembly differs from the desired frequency posted in the control box by 250 kilocycles. This is always the case as this value represents the starting point of the frequency range of the second synthesizer. In practice, by an arrangement explained in the description of the aforementioned patent application, it is possible by means of a logic circuit employing simple wiring to take account of this difference in the process of counting harmonics which serve to constitute the synthesized frequencies so that, for a posting of 28.347 megacycles in the control box, the first synthesizer $S_1$ provides the first signal $F_1$ not at 28.3 megacycles but as 28.050 megacycles. In other words, a compensating frequency difference of 250 kilocycles is introduced in the first signal coming from the first synthesizer which compensates for the starting frequency of the second synthesizer frequency range. By this means the synthesizer $S_3$ delivers an actual output frequency $F_s$ equal to 28.050+297=28.347 megacycles which will be recognized as being the numerical value represented by the digits in the positions of the control box.

The third synthesizer $S_3$ carries out a frequency exploration process throughout the frequency range of the first synthesizer $S_1$. The exploration is stopped in the present invention not by a method of counting harmonic frequencies as is described in the aforementioned patent application, but by the appearance of a single pulse, this corresponding to the condition:

$$F_s-F_2 \text{ (stabilized)} = F_1 \text{ (stabilized)} \quad (1)$$

i.e. $F_s=F_1+F_2$.

In actual fact, in the arrangement described in more detail later, it will be seen that the exploration of the third synthesizer oscillator results in two pulses being generated and one of which is spurious and must be suppressed.

Consider, for example, the first synthesizer providing a first frequency signal from a selected partial band oscillator B which may be constructed in the same way as the oscillator B of the previously mentioned patent application to cover the range 50 megacycles to 60 megacycles. A divide-by-two operator II which may be identical to the operator II mentioned in the aforementioned patent application, provides a subsidiary frequency range of 25 to 30 megacycles. The third synthesizer preferably has the same arrangement of oscillators so that it commences a frequency exploration starting at 25 megacycles. As the third signal frequency increases during the exploration it passes through a frequency $f_s$ (image frequency) which is spaced below the stabilized second signal frequency by the same amount as the actual frequency desired to be delivered is spaced above the second signal frequency. When the third signal frequency passes through the image frequency $f_s$, a first pulse is delivered in accordance with the equation $$f_s+F_2=F_1 \quad (2)$$

i.e. $f_s=F_1-F_2$.

If the effect of the pulse generated when this occurred was not suppressed one would have a false synchronization at an image frequency $f_s=27.753$ megacycles, because 20.753 equals 28.050−0.297 megacycles. The presence of the suppression circuitry prevents synchronization from this source of error so that synchronization of the third synthesizer will only occur when the third signal is actually equal to the sum of the first and second signals.

Another difficulty having to be overcome resides in the disparity of frequency between the selected oscillator of the first synthesizer $S_1$ and the corresponding oscillator of the third synthesizer $S_3$. The two oscillators have the same frequency range so that if one oscillator B of the first synthesizer $S_1$ is selected covering the range 50 megacycles to 60 megacycles, the selector will choose the corresponding oscillator B' which covers the same range in the third synthesizer $S_3$. However, it will be apreciated that the oscillator B' of the third synthesizer may be required to supply a substantially higher frequency because it provides, in practice, the sum of the signal frequencies $F_1+F_2$. In actual practice, if the output frequency of the third signal from the third synthesizer lies close to the lower limit of the band, that is to say it is in the vicinity of 2.5 megacycles, the maximum divergence between the frequencies delivered by the synthesizer $S_1$ and $S_3$ can reach 349 kilocycles at the terminal from which the output frequency is delivered, but this divergence can be as much as sixteen times more than that value, that is to say 5.584 megacycles, at the output terminal of the oscillator B′ if the divide-by-sixteen fifth operator is in use.

The oscillators A′, B′, C′ of the third synthesizer and which cover respectively the ranges 40 to 50 megacycles, 50 to 60 megacycles and 60 to 70 megacycles cannot, like their similarly numbered counterparts A, B, C of the synthesizer $S_1$ allow such an extension of range, which represents more than 11% of the maximum frequency of 50 megacycles per second for the oscillator A′, more than 9% of the maximum frequency of 60 megacycles for the oscillator B′, and in the vicinity of 8% of the maximum frequency of 70 megacycles for the oscillator C′. In the case of the fourth oscillator D′ the extension of range is permissible as it is only of the order of 7%.

To take account of this problem the synthesizer assembly is preferably provided with an arrangement for substituting the oscillators B′, C′, and D′ respectively for the oscillators A′, B′, and C′ of the third synthesizer in the event of an exploration of frequency carried out on one of these oscillators not supplying the desired frequency.

Figure 2:
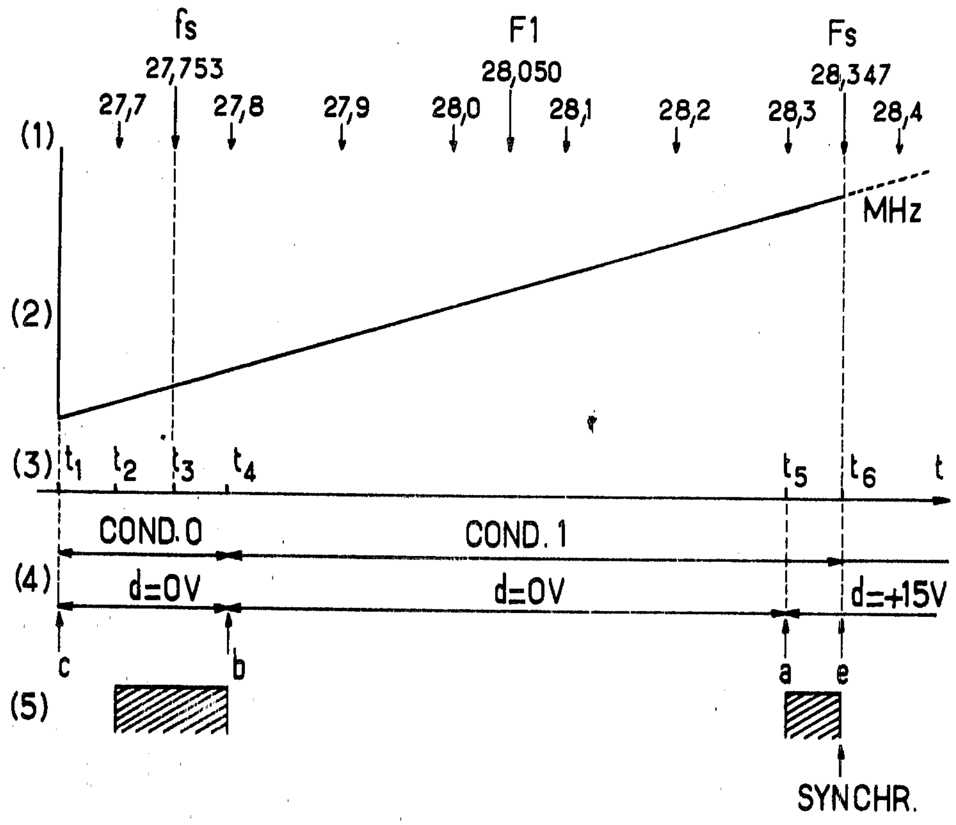

In one such arrangement, successive frequency explorations are conducted respectively on one oscillator and on the oscillator immediately adjacent to it by a suitable commutating assembly. This will become apparent from the more detailed explanation of one embodiment of the invention given below with reference to the accompanying drawings, in which:

FIG. 1 is a schematic diagram of principal parts of a wide-band frequency synthesizer assembly operating automatically and employing the present invention to provide a short quantification step of 1 kilocycle; and, FIG. 2 is a timing diagram explaining the sequence of operation of the synthesizer assembly.

Referring to FIG. 1 a first wide-band high frequency synthesizer 400 is contained within the box shown in broken line and provides a relatively wide quantification step of 100 kilocycles per second. This first synthesizer is designated below as $S_1$.

A simplified low frequency synthesizer 500, also shown within a broken line box, covers a relatively small frequency range of 250 kilocycles to 349 kilocycles at a small quantification step of 1 kilocycle. The small range synthesizer 500 is designated below as $S_2$.

The frequency output of both of the synthesizers 400 and 500 is determined by respectively the higher and lower order degits of a numerical value posted into a control box 600 and significant of the output frequency to be delivered. The control box 600 is provided with five decimal positions in each of which a digit of the numerical value of the desired frequency is posted.

A third synthesizer 700 provides the desired output high frequency by an interpolation loop. The third synthesizer is designated below as $S_3$.

The first or wide step synthesizer 400 has been fully described in our aforementioned patent application and will not therefore be again described now. Briefly, it is illustrated in FIG. 1 by its logic input connections formed by a three decade counter 404, and its output circuitry formed by a group 401 of four partial band oscillators A, B, C, D supplying via a commutator 403 and four division circuits or operators 402 (providing operators I to V, respectively) an output frequency $F_1$ which is stabilized and is determined by the digits of the three higher order decimal places of the control box 600. In practice, if the three high order positions of the control box have in them the digits 2, 8, 3 the oscillator B delivers by way of operator II is afirst signal at a frequency $F_1$ of 28.050 megacycles.

The synthesizer 400 receives a spectrum of harmonics at 100 kilocycles spacing from a generator of harmonics H supplied by a quartz oscillator Q. The synthesizer also receives from the generator H a discrete frequency of 2 megacycles.

The low frequency synthesizer 500 has a variable exploratory oscillator 501 which covers the range 50 megacycles to 70 megacycles and is controlled in frequency in a well-known manner by a diode circuit (not shown) having a variable capacity and able to control the exploration of the high frequency range by a reduction of circuit reactance. The output of the oscillator 501 is applied to a modulator 502 which is followed by a narrow band filter 503 centered at 2 megacycles per second and which supplies a phase discriminator 504 for identifying a frequency coincidence. The oscillator 501 is controlled during frequency exploration by a saw-tooth voltage applied to it by a saw-tooth voltage generator 505.

The oscillator 501 also has its output connected to a second modulator 506 which has its output connected to a narrow band filter 507 centered at 25 kilocycles. A divide-by-two circuit 508 follows the filter 507 and provides counting pulses to a two-decade counter 509. A diode 510 is provided with its anode connected to a common point 511 to which are connected the output of the phase discriminator 504 and the input control voltage of the saw-tooth voltage generator 505. The diode 510 has its cathode connected to the output of the counter 509 and controls the blocking and unblocking of synchronizing signals fed from the phase discriminator 504 to a switching circuit (not shown) which switches the oscillator 501 from exploratory control to synchronized control.

A frequency divider 512 having a ratio 1/200 is connected to receive the output of the oscillator 501 and ensures the division of the frequency range 50 to 70 megacycles of the oscillator into the desired working range of 250 kilocycles to 349 kilocycles which supplies an output second signal $F_2$ from the second synthesizer 500. The harmonics generator H is connected to provide the second synthesizer with a spectrum of harmonics and also with the discrete frequency of 2 megacycles per second.

The low frequency synthesizer 500 operates as follows:

The counter 509 is connected to the two lower order positions of the control box 600 and has transferred into it the posting of the units and tens digits of the desired frequency which is posted in the control box 600 in kilocycles.

At the beginning of a frequency exploration, the diode 510 clamps the potential of the point 511 to ground. As a result the output of the phase discriminator 504 is blocked and the saw-tooth generator 505 functions to control the frequency exploration stage of the oscillator 501.

During the course of the exploration, at each coincidence of the frequency of the oscillator 501 with the successive hormonics at 100 kilocycles derived from the quartz oscillator Q, two characteristic beat periods are produced in the output of the modulator 506 and accordingly two pulses issue from the narrow band filter 507. As a result of the divide-by-two circuit 508 in the output path between the filter 507 and the counter 509, one pulse only is received by the counter for each frequency coinicidence.

When the number of pulses received by the counter 509 is significant of the value posted in the last two positions of the control box 600 (this corresponds actually to the penultimate coincidence owing to certain characteristics of the counter as is explained in more detail in the co-pending application) the counter 509 applies a voltage of +15 volts to the cathode of the diode 510 which is thus back-biased to cut-off and frees the output of the phase discriminator 504 so that when the following beat arrives the output of the discriminator 504 synchronizes the oscillator 501 with the desired hamonic of the spectrum obtained from the generator H.

The synchronized output signal of the oscillator 501 is now divided by 200 by virtue of the 1/200 division circuit 512 and provides the second signal frequency $F_2$ which, if the frequency posted in the control box is 28,347 kilocycles, is 250+47=297 kilocycles. The switching of the oscillator 501 into the synchronized condition is naturally accompanied by prevention of the release of a fresh saw-tooth exploratory voltage to the oscillator so that the exploration phase ceases.

The first and second signals $F_1$ and $F_2$ derived from the first and second synthesizers, respectively, are applied to a third synthesizer 700. This is provided with a group of ocillators A′, B′, C′, D′ which are identical to the four oscillators A, B, C, D of the first synthesizer. Likewise, a group 702 of four operators formed by appropriate division circuits and identical to the group 402 is arranged to receive selectively frequencies passed to it by one arm of a double commutator 703*a*. The other arm of the commutator is connected to the selected oscillator of the group 701 and, in certain circumstances as is explained hereafter, is switchable between two positions as is shown in dotted outline. The commutator 703 is positioned by a counter 704 in much the same way as the commutator 403 of the first synthesizer 400 is positioned by the counter 404.

The frequency exploration of the third synthesizer 700 is controlled by the output of a saw-tooth voltage generator 705. The output frequency from the chosen operator 702 is applied to an input of a modulator 709 which is followed by a band-pass amplifier 710 which transmits the frequency band 250 kilocycles to 349 kilocycles to an input terminal of a phase discriminator 711 providing a frequency comparator. The phase discriminator 711 has a second input terminal at which is received the second signal $F_2$ from the low frequency synthesizer 500. The phase discriminator 711 provides an output signal when it detects coincidence between the two input frequencies and, if not blocked, this output signal is applied to a switching circuit (not shown) which switches to synchronized control whichever of the oscillators A′, B′, C′ and D′ is operating in exploratory control.

The first signal $F_1$ from the first synthesizer 400 is applied to a second input of the modulator 709.

A binary flip-flop circuit 707 serves, by means of the counter 704, to oscillate the commutator arm 703*a* of the commutator 703 under certain conditions which will be specified below. A flip-flop circuit 713 having three input *a*, *b*, *c* and an output terminal *d* is also provided in the third synthesizer, as is also a differentiation network 706.

During the course of a frequency exploration carried out by one of the oscillators of the third synthesizer selected by the member 704, a first set of modulation product frequencies appear in the output of the modulator 709 which lie in the pass-band 250 kilocycles to 349 kilocycles of the filter amplifier 710. These frequencies arise from the modulation product formed by the difference between the frequency of the signal $F_1$ when the third synthesizer is in exploratory control. Among the frequencies of the first set passed by the filter amplifier 710 is the frequency $f_s$ which would cause an incorrect synchronization and which must therefore have its effect on the behaviour of the third synthesizer suppressed.

A diode 708, connected between a common point 712 in the output of the phase discriminator 711 and the saw-tooth generator 705, clamps this point to zero voltage at the beginning of a frequency exploration. The ouput of the phase discriminator 711 is therefore blocked so that exploratory control is exercised by the generator 705.

To prevent the image frequency $f_s$ from producing an undesired synchonization, the flip-flop circuit 713 operates in the following way. In the first place, the commencement of the saw-tooth voltage supplied by the generator 705 produces via the differentiation circuit 706 a pulse which is applied to the input terminal *c* of the flip-flop circuit 713 to return it to its zero condition and simultaneously to latch it. The passage of said first set of modulation product frequencies produces at the output of the pass-band amplifier 710 a square waveform the front face of which is positive and the rear face of which is negative. The positive face has no triggering effect on terminal *a* of the flip-flop circuit 713 as it is latched. The negative face, transmitted to the terminal *b* has the effect of unlatching the flip-flop circuit 713 so that it is ready to be triggered by the next positive voltage applied to input terminal *a*. The frequency $f_s$ which reaches the flip-flop circuit 713 before the arrival of the negative face of the peaked waveform is accordingly ineffective to trigger operation of the flip-flop and its effect is therefore suppressed.

The front face of a second square waveform issuing from the pass-band amplifier or filter 710 on the generation by the oscillator of the third synthesizer in exploratory control of frequencies greater than $F_1$, is applied to the flip-flop circuit 713 at the input terminal *a* and is able to trigger operation of the unlatched flip-flop so that its terminal *d* provides a positive voltage of 15 volts. This voltage back-biases the diode 708 beyond cut-off so that the output of the phase discriminator 711 can be transmitted to halt frequency exploration when the correct synchronizing frequency $F_s$ occurs. This is found by modulating the delivered frequency with $F_1$ to provide a modulation product which, when equal to the frequency of the second signal $F_2$ produces an output signal from the phase discriminator 711 by the way of the point 712. Thus synchronization of the synthesizer is effected at the frequency $F_s=F_1+F_2$ and simultaneously the saw-tooth generator 705 is prevented from releasing a fresh saw-tooth and a switching circuit (not shown) applies a constant synchronizing voltage to the oscillator formerly in exploratory control.

The operation of the synthesizer assembly will now be described in more detail with reference to FIG. 2, which should be referred to simultaneously with FIG. 1.

FIG. 2 shows an upper horizontal first scale of frequency *f*(1), commencing a little below 27.7 megacycles and terminating a little beyond 28.4 megacycles, which corresponds to the preceding hypothesis where the frequency of the signal $F_1$ is equal to 28.050 megacyles.

The upwardly sloping line shows the shape of the saw-tooth exploratory voltage applied to the chosen variable oscillator of the group 701. At the beginning of the exploratory stage the saw-tooth voltage begins with a negative ramp face.

The horizontal axis (3) is a time scale on which are plotted six relevant times denoted by $t_1$ to $t_6$.

The second horizontal scale (4) carries indications corresponding to the fuctioning of the bistable flip-flop circuit 713, "CONDITION O" meaning that flip-flop circuit is held latched so that it cannot be triggered, and "CONDITION 1" meaning the flip-flop circuit is prepared for triggering when the next input signal is received at terminal *a*.

Finally the curves shown along horizontal axis (5) denote the level of output of the pass-band filter or amplifier 710.

At the beginning of an exploration of the third synthesizer 700 (at time $t_1$), the negative ramp face of the saw-tooth exploratory voltage is converted by the differentiation network 706 into a pulse which is transmitted to the bistable flip-flop circuit 713 to return it to its initial condition. The output voltage of the flip-flop circuit 713 falls to zero and it assumes the CONDITION O at which it is incapable of being triggered by pulses applied to its input terminal *a*.

During the exploration frequencies are generated between 27.701 megacycles and 27.8 megacycles. This range of frequencies results, after being modulated with the first signal $F_1$ in the modulator 709, in a modulation product lying within the pass-band of the filter amplifier 710. The amplifier therefore provides a voltage output form shown on axis (5) and having a positive ramp face occurring at time $t_2$ followed by a negative ramp face occurring at time $t_4$. As has previously been mentioned, the flip-flop circuit 713 has these two ramp signals applied to its two input terminals *a* and *b* but it is so constructed that the positive ramp face has no effect whatever on the flip-flop circuit 713 when applied to terminal *b* and, as the flip-flop circuit 713 is held at this time in CONDITION O the positive ramp face produces no effect when applied to the input terminal *a* either. At some time $t_3$ lying between times $t_2$ and $t_4$ the third signal provided from the third synthesizer 700 passes through a frequency $f_s$ which is the image frequency referred to above and which is less than the frequency of the first signal $F_1$ by an amount such that it is capable of combining with the first signal in the modulator 709 to provide a modulation product which is interpreted by the frequency comparator formed by the phase discriminator 711 as a frequency at which synchronization of the third synthesizer should take place. This image frequency $f_s$ corresponds to 20.05 megacycles minus 0.297 megacycle which equals 27.753 megacycles.

At time $t_4$ the negative ramp face of the output waveform of the filter amplifier 710 is applied to the two input terminals *a* and *b* of the flip-flop circuit 713. The negative ramp face applied to the input terminal *b* shifts the flip-flop circuit 713 into CONDITION 1 at which it is capable of being energized by the next positive pulse applied to its input terminal *a*. As the terminal *a* is insensitive to negative voltage pulses, the flip-flop circuit 713 is not triggered so that the voltage output at terminal *d* remains at zero and the diode 708 remains polarized with direct current so that the common point 712 short circuits the output of the phase discriminator 711. The phase discriminator output is therefore not applied to the saw-tooth voltage generator 705 which therefore continues to operate in the exploratory phase and false synchronization of the third synthesizer is thus suppressed.

At time $t_5$ the third signal frequency $F_s$ passes through the value 28.050+0.250=28.300 megacycles. This frequency, when mixed with the frequency of the first signal $F_1$ results once again in the formation of a modulation product in the modulator 709 capable of being passed by the filter amplifier 710. In consequence a second square-wave voltage pulse commences with a positive ramp face at time $t_5$ as is shown by axis (5). This positive ramp voltage is applied to terminal *a* of the flip-flop circuit 713 which, being in CONDITION O, is triggered to raise the output voltage at the cathode of the diode 708 to 15 volts. This inversely polarizes the diode 708 which therefore cuts off and allows an output signal from the comparator or phase discriminator 711 to be applied as a synchronizing signal to the saw-tooth voltage generator 705 and the switching circuits of the oscillators 701 via input terminal *e*.

After time $t_5$ the frequencies passed by the filter amplifier 710 progressively increase until time $t_6$ is reached. At this time the frequency of the third signal $F_s$ delivered by the third synthesizer is given by the equation:

$$F_s=28.050+0.297=28.347 \text{ megacycles}$$

This frequency will be recognized as being that posted in the control box 600. At time $t_6$ the frequency passed by the filter amplifier 710 is the difference frequency between the first and third signal frequencies and is 297 kilocycles which will be recognized as being the same frequency as the second signal $F_2$ derived from the second synthesizer. The comparator phase discriminator 711 recognizes the coincidence in frequency and responds by applying a continuous synchronizing voltage to the oscillator group 701 while simultaneously controlling the saw-tooth voltage generator 705 to prevent it from exercising any further control over the frequencies of the oscillator group which thus pass from the exploratory phase to the synchronized phase.

From the above description it will be understood that synchronization is carried out at the correct frequency and the risk of false synchronizing at the image frequency $f_s$ is eliminated. The definition of the third synthesizer is that of the second synthesizer, namely 100 kilocycles, and the time taken for the synchronization of the synthesizer assembly to take place is substantially the same as that normally encountered with a synthesizer of very much larger quantitative step having the same overall frequency range.

If subsequently synchronization is lost, the output of the phase discriminator 711 disappears and the negative voltage produced by it at the common point 712 falls to zero. The saw-tooth voltage generator 705 is no longer prevented from operating and immediately emits a fresh saw-tooth. This saw-tooth voltage commences with a negative ramp face as shown in FIG. 2 and this is transmitted through the differentiating circuit 706 to the terminal *o* of the flip-flop circuit 713 which is returned to its initial state referred to above as CONDITION O.

As mentioned previously, the group 701 of oscillators of the third synthesizer are required to provide a frequency slightly different from the frequency supplied by the corresponding oscillator of the group 401 of the first synthesizer. It can therefore happen that the frequency exploration of the oscillator selected (B′ is the case taken as example) is incapable of providing the third signal of the desired synchronizing frequency $F_s$. A failure to synchronize during one saw-tooth voltage results in the following saw-tooth voltage being applied to the oscillator group 701 of the third synthesizer. However, this second saw-tooth voltage like its predecessor is differentiated by the differentiating circuit 706 and is applied to the binary flip-flop circuit 707 as well as to terminal *c* of the flip-flop circuit 713 to return it to CONDITION O. The application of the pulse to the input of the flip-flop circuit 707 alters its output and, by means of the counter 704, the commutator arm 703*a* is slid by one step from the contact corresponding to oscillator B′ to the contact connected to the oscillator C′ as is shown in broken outline in FIG. 1. Therefore the exploration saw-tooth voltage applied by generator 705 is transferred from the oscillator B′ to the oscillator C′. If synchronization still does not take place the third saw-tooth voltage from the generator 705 provides a further pulse to the bistable flip-flop circuit 707 which returns the member 704 to its former position so that the commutator arm 703*a* returns to the terminal corresponding to oscillator B′. It will thus be appreciated that successive saw-teeth are applied alternately to neighbouring oscillators of the group 701.

The switching of the commutator arm 703*a* between the terminals of oscillator pairs does not occur when the contact arm 703*a* is at the terminal corresponding to the oscillator D′. As previously mentioned, the frequency difference between the oscillator D′ of the group 701 and the oscillator D of the group 401 is within the frequency range of the crystal oscillators used.

In the above described example it is possible to obtain the posted frequency in less than two seconds at a definition of 1 kilocycle within the total range of the frequency assembly which extends from 2.5 megacycles to 80 megacycles.

Although precise numbers have been given in the example described in order to facilitate understanding, it will be appreciated that other numbers may be substituted in their place.

It is also to be understood that the process of interpolation within a wide quantification step provided by the invention can be repeated by the association of several interpolation loops similar to that which has been described. One could, for example, obtain a definition of the frequency with six decimal figures by providing three synthesizers, one for wide band and two with narrow bands providing the two degrees of interpolation required. Each of the three synthesizers would then be controlled by a unique pair of positions in the control box which would naturally be provided with six positions and six control knobs to set the digits placed in respective positions.

We have shown and described an embodiment in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as are obvious to one of ordinary skill in the art.

We claim:

1. A synthesizer assembly providing frequencies in steps over a relatively wide high frequency range, comprising a first wide band high frequency synthesizing means providing first high frequency signals over said range in relatively large quantification steps, second low frequency synthesizing means providing second low frequency signals having a relatively small quantification step over a relatively narrow frequency range which embraces the quantification step of said first synthesizing means, control means for storing a numerical value significant of a desired frequency to be delivered by the synthesizer assembly, said control means having respective positions in which digits of the numerical value are posted, connection means connected to said control means for applying respectively higher and lower order digits of said posted numerical value to said first synthesizing means for producing a third frequency signal different from the first and second signal frequencies but synchronized in frequency therewith while being equal to a modulation product thereof, and suppression circuit means for preventing the third frequency signal of the third synthesizing means from being synchronized with any other frequency than said modulation product.

2. A synthesizer assembly as claimed in claim 1, in which said third synthesizing means includes first modulating means for modulating said first and third frequency signals with said third synthesizing means of exploratory control to provide a low frequency modulation product, frequency comparator means for comparing the low frequency modulator product with said second frequency signal and means responsive to a coincidence between the two input frequencies to said frequency comparator means for switching the third synthesizing means from exploratory control to synchronized control.

3. A synthesizer assembly as claimed in claim 2, in which said suppression circuit means includes switching means for preventing said third synthesizing means from being switched to exploratory control by the means responsive to said frequency comparator means in response to the first of two coincidences of the modulation product with the second signal which occur during a single sweep of said third synthesizing means in exploratory control.

4. A frequency synthesizer assembly having a control device for storing a numerical value significant of the desired frequency to be delivered and composed of digits stored in respective positions in the control device, first high frequency synthesizing means providing high frequency signals over a relatively large range with a wide quantification step and controlled by higher order positions of said control device to provide a first frequency signal which is determined by said higher order positions of the stored numerical value, second relatively low frequency synthesizing means providing low frequency signals over a relatively small frequency range with a narrow quantification step and providing a second signal at a frequency controlled by the lower order positions of the numerical value stored in said control device, first modulating means for modulating said first and second signals to provide a modulation product equal to the desired frequency comprising third frequency synthesizing means for providing a variable frequency third signal from an oscillator switchable between exploratory control at which it is adapted to hunt for the desired frequency and synchronized control at which the desired frequency is delivered after it has been found, second modulator means connected to receive the first and third signals for providing a modulated output thereof, a filter circuit having a pass-band substantially equal to the frequency range of said second synthesizing means connected to the output of said second modulator means, frequency comparator means connected to monitor simultaneously the modulated output transmitted through the filter circuit and said second frequency signal, said frequency comparator means providing a switching signal when there is coincidence between the two frequencies, a switching circuit responsive to the reception of said switching signal from said frequency comparator means to switch said oscillator of said third synthesizing means from exploratory control to synchronized control, and suppression circuit means effective during each frequency exploration of said oscillator to prevent said switching circuit from switching said oscillator in response to the output of the comparator occurring with the first frequency coincidence detected by it during an exploratory sweep.

5. A frequency synthesizer assembly as claimed in claim 4 in which the frequency range of the second synthesizing means is equal to the quantification step of said first synthesizing means and the frequency of the second frequency signal is synchronized by a harmonic generator which also synchronizes said first synthesizing means.

6. A frequency synthesizer assembly as claimed in claim 4 in which the synthesizing circuitry providing the second signal is a single frequency synthesizer.

7. A frequency synthesizer assembly as claimed in claim 4, in which said second synthesizing means providing the second frequency signal comprises a plurality of frequency synthesizers each of which provides an output signal frequency at a value determined by unique positions of said control device.

8. A frequency synthesizer assembly as claimed in claim 4 in which said filter circuit comprises a pass-band amplifier.

9. A frequency synthesizer assembly as claimed in claim 4 in which said suppression circuit means includes means which prevents, by earthing, the output of the comparator, the switching of said third synthesizing means from the exploratory phase to the synchronized phase when the first coincidence occurs between the two comparator input frequencies during an exploratory sweep.

10. A frequency synthesizer assembly as claimed in claim 9 in which said suppression circuit includes a bistable device capable of being triggered between a first state at which it alows said third synthesizing means to be switched from the exploratory phase to the synchronized phase, and a second state at which it is latched, said bistable device having a single output terminal and three input terminals, one input terminal of which controls the return of the bistable member to the second state at which it is latched and a second input terminal to which a pulse must be applied to unlatch the member so that it can be triggered to its first state by the application of a pulse to the third terminal.

11. A frequency synthesizer assembly as claimed in claim 10 in which the second and third input terminals are connected to one another and the second terminal unlatches the device on receipt of a pulse of one polarity whereas the third input terminal only triggers the device between its two states on receiving a pulse of the opposite polarity.

12. A frequency synthesizer assembly as claimed in claim 11 in which exploratory control of said third synthesizing means is controlled by a saw-tooth voltage generator commencing its sweep with a ramp voltage, and a differentiating circuit connected between the saw-tooth generator output and the first input terminal of the bistable device to provide a pulse reverting the device to its second latched state at the beginning of an exploratory sweep.

13. A frequency synthesizer assembly as claimed in claim 12, in which the differentiating circuit output pulse is applied to a second bistable device to switch it between a first state at which the output signal of said third synthesizing means is obtained from one partial band oscillator of a group of oscillators forming part of said third synthesizing means under exploratory control and a second state which connects a second oscillator of said group of oscillators covering the neighboring partial band to provide the desired output frequency.

14. A frequency synthesizer assembly as claimed in claim 13, in which said third synthesizing means includes a double-armed commutator having one arm switchable between partial band oscillators of said group of oscillators, and the second arm selectively connectible to a set of different binary division circuits from which the third frequency signal is obtained.

No references cited.

JOHN KOMINSKI, Primary Examiner

U.S. Cl. X.R.

331—16, 18